No. 691,717. Patented Jan. 21, 1902.
S. FURMIDGE.
WHEEL.
(Application filed Jan. 17, 1901.)
(No Model.)
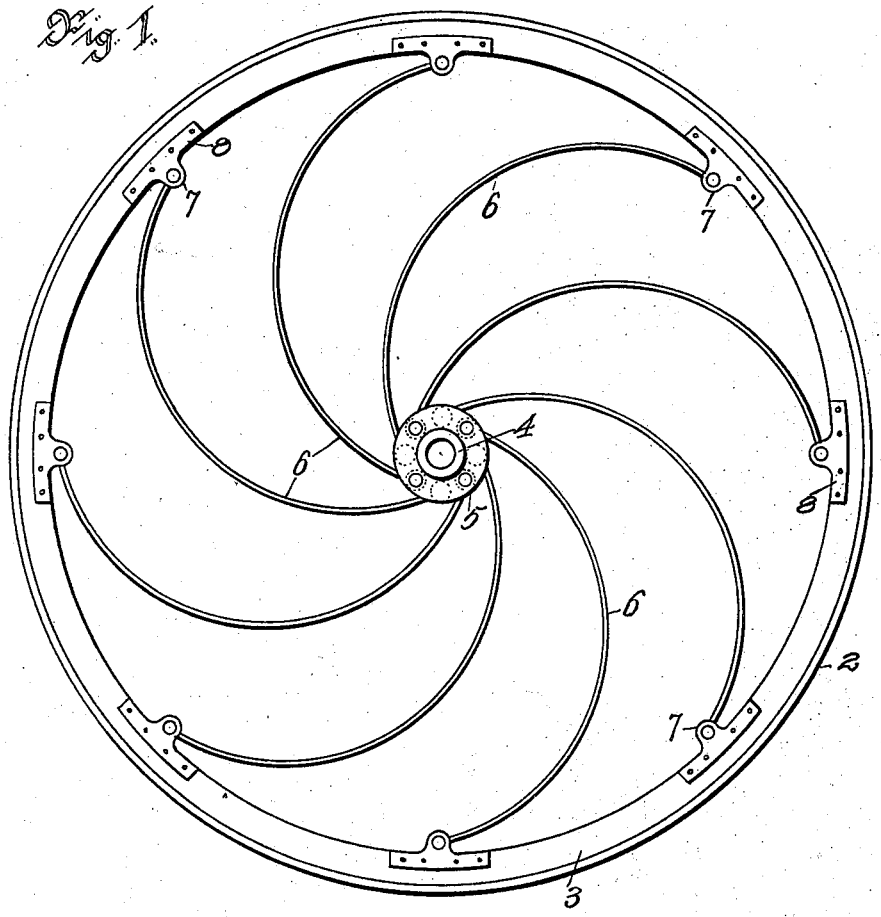
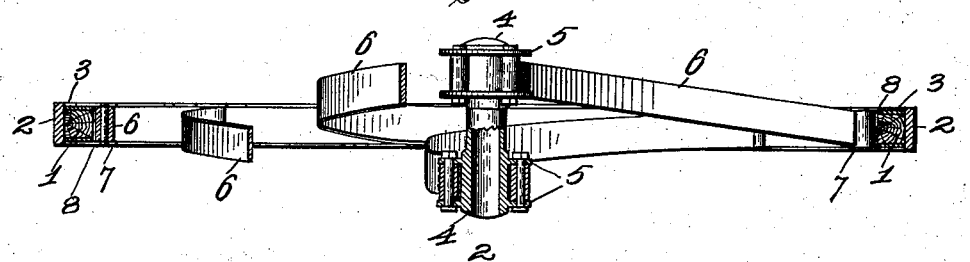
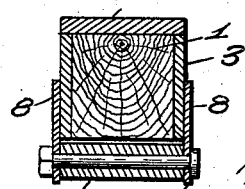

UNITED STATES PATENT OFFICE.

SAMUEL FURMIDGE, OF ST. LOUIS, MISSOURI, ASSIGNOR TO THE FURMIDGE SPRING WHEEL COMPANY, OF PIERRE, SOUTH DAKOTA, A CORPORATION OF SOUTH DAKOTA.

WHEEL.

SPECIFICATION forming part of Letters Patent No. 691,717, dated January 21, 1902.

Application filed January 17, 1901. Serial No. 43,589. (No model.)

*To all whom it may concern:*

Be it known that I, SAMUEL FURMIDGE, of the city of St. Louis, State of Missouri, have invented certain new and useful Improvements in Wheels, of which the following is a full, clear, and exact description, reference being had to the accompanying drawings, forming a part hereof.

This invention relates to wheels; and it consists of the novel construction, combination, and arrangement of parts hereinafter shown, described, and claimed.

The object of this invention is to provide an improved wheel having resilient or spring spokes, whereby the hub may vary from its central position relative to the rim of the wheel, but is positively braced against lateral movement. This latter result is accomplished by making the spokes identical in shape, they being perfect arcs and of flat sheet metal inflexible laterally and being attached to the hub on the side opposite from their attachment to the rim and having their inner ends braced between broad flanges extending from the body of the hub; also, by attaching the adjacent spokes to different ends of the hub in a sort of staggered form to serve as props or retainers for the hub.

In the drawings, Figure 1 is a side elevation showing my improved wheel. Fig. 2 is a cross-sectional view of the same, taken approximately through the center. Fig. 3 is an enlarged sectional view of the rim of the wheel.

In the construction of my improved wheel I provide a rigid rim, consisting of the felly 1, preferably of wood, and the metallic tire 2. The sides of the felly are inclosed by the metallic plates 3, which add greater strength to the rim of the wheel.

4 indicates the hub of the wheel, which is of any desired length and is provided near each end with two flanges 5, between which are formed grooves or recesses for the reception of the ends of the spokes.

The spokes 6 of the wheel are constructed of spring metal and are formed in any desired shape, and their inner ends are pivoted between the flanges 5, and their outer ends are connected to the rim of the wheel. The outer ends of the said springs are pivoted between the ears 7 integral with the small plates 8, which are firmly attached to the sides of the rim. As shown in Fig. 1, the springs are arcuate and describe unbroken curves from end to end, thus making them resilient and springy throughout their length. These springs are of equal length, and the chords thereof are greater than the radius of the wheel, in which respect my wheel is differentiated from all others. In other words, for example, the spring or spoke 6, which has its lower end attached to the lower part of the wheel directly below the hub, has its upper end attached to the hub above a line drawn horizontally through the center of the hub. By this arrangement the hub may be said to be "suspended" and not upheld from below, since the springs, which have their inner ends secured to the hub on their under side, have their outer ends secured to the rim of the wheel above the hub. This permits the hub to have a certain backward-and-forward movement, which it would not have were the chords of the arcuate springs of less length than the radius of the wheel. At the same time the wheel is possessed of great strength, and the hub will assume its normal position after the obstruction which caused the oscillation has been passed over. Furthermore, as may be seen by referring to Fig. 1, the flanges 5 project beyond the surface of the hub, and the inner ends of the spokes fit closely between these flanges. The flanges extend out a sufficient distance to give side bearing to the spokes and firmly brace them in the required plane, so that the hub does not and cannot move laterally, as would occur were the spokes not so braced. In other words, the end of each spoke extends a sufficient distance between the flanges to obtain side support, whereby it will be positively held in position before it reaches the pin by which it is held. The necessity of attaching the spokes to the hub on the side opposite from that on which they are attached to the rim of the wheel arises from the fact that a spring-spoke of this character must have little bend and yet be as long as possible in order to give the proper resiliency; also, the spring must be an unbroken curve in order to make it equally resilient at all points throughout its length. I have found from practical experience that a spoke attached to the hub on the same side on which it is attached to the rim of the wheel does not bend equally throughout its length when subjected to pressure, and for this reason I have constructed the spokes as above described and fasten them to the opposite side of the hub. Furthermore, a direct line of resistance exists between the ends of the upper spokes, so that the hub is always suspended when under pressure and meets with no resistance from its under side to the lower part of the rim, for the reason that the upper spokes suspend from the upper part of the rim to the lower side of the hub and the lower spokes from the upper side of the hub to the lower side of the rim. I have found by experiment that a wheel of this character is thoroughly practicable and is subject to none of the objections urged against those wheels having spring-spokes of ordinary construction, and on this feature I desire to be protected. The adjacent pairs of spokes are connected to different ends of the hub, thereby preventing the hub from any lateral movement. This feature is best shown in Fig. 2, wherein it may be seen that there are two flanges 5 near each end of the hub, making four flanges in all. These flanges project beyond the surface of the hub and are broad enough to give side bearing to the spokes and thereby brace the hub against lateral movement, as above explained. Half of the spokes are attached to each end of the hub, and the adjacent spokes, as stated, are connected to different ends, thereby giving additional strength against lateral movement, which must be guarded against to render a wheel of this character practicable. Furthermore, it may be seen that the spokes 6 are of flat sheet metal bent into the form described and adapted to bend only in the plane of the tire of the wheel. In other words, the spokes are flat and bend only in the planes of their chords and are inflexible laterally to assist in retaining the hub in the required position relative to the rim and prevent it from side movement. Hence it may be seen that the spokes being flexible only in one direction coöperate with the flanges 5 to brace the hub in its required central position.

I am aware that wheels having round spring-spokes have heretofore been constructed; but they have all been more or less subject to the objection of the lateral movement of the hub and to that degree impracticable, and a means to effectively overcome that objection constitutes one of the main features of my invention.

A wheel constructed in accordance with my invention may be of any desired size, and, as above stated, the spokes may be in any form so long as they are resilient and will hold the hub in the required position. The wheel may be made of greater strength by increasing the thickness and strength of the spokes which are used.

I have shown and described one form of spring; but it is manifest that the same principle will be involved in using any yielding connection between the hub and the rim, and I do not desire to limit myself to the specific construction shown and described.

I claim—

1. The improved wheel, having a rim consisting of the wooden felly 1, metallic tire 2 and the side plates 3, one on each side of the felly, an integral elongated hub having two flanges 5 near each end and extending beyond the surface of the hub to form deep grooves or recesses, and the flat bow-spring spokes 6 having their inner ends attached to the hub within the grooves or recesses formed by the said flanges 5 and their outer ends attached to the rim, the adjacent spokes being attached to opposite ends of the hub to prevent it from moving laterally relative to the rim, substantially as specified.

2. The improved wheel, consisting of an inflexible rim, an elongated integral hub having two flanges near each end extending beyond the surface of the hub to form grooves, flat laterally-inflexible bow-spring spokes having their inner ends attached to the hub between the flanges and extending between the flanges tangentially to the body of the hub, the inner ends of the adjacent spokes being attached to different ends of the hub to prevent it from moving laterally relative to the rim, and the outer ends of the spokes being pivotally connected to the rim.

In testimony whereof I affix my signature in presence of two witnesses.

SAMUEL FURMIDGE.

Witnesses:
EDWARD E. LONGAN,
ALFRED A. EICKS.